United States Patent [19]

Damico et al.

[11] 3,952,115

[45] Apr. 20, 1976

[54] FORTIFICATION OF FOODSTUFFS WITH N-ACYL DERIVATIVES OF SULFUR-CONTAINING L-AMINO ACID ESTERS

[75] Inventors: Ralph Anthony Damico; Robert Wayne Boggs, both of Cincinnati, Ohio

[73] Assignee: The Procter & Gamble Company, Cincinnati, Ohio

[22] Filed: Apr. 2, 1975

[21] Appl. No.: 561,737

[52] U.S. Cl................................. 426/590; 426/615; 426/618; 426/619; 426/633; 426/634; 426/641; 426/656
[51] Int. Cl.[2]...................... A23L 2/38; A23L 1/38; A23L 1/30; A23J 3/00
[58] Field of Search ........... 426/104, 615, 618, 619, 426/633, 634, 641, 656, 590

[56] References Cited
UNITED STATES PATENTS 3,878,305    4/1975    Damico et al. ..................... 426/104

*Primary Examiner*—James R. Hoffman
*Attorney, Agent, or Firm*—Richard C. Witte; Julius P. Filcik; Jerry J. Yetter

[57] ABSTRACT

A proteinaceous foodstuff comprising an edible sulfur-containing amino acid deficient protein and a nutritionally supplemental amount of a sulfur-containing amino acid derivative selected from the group consisting of N-acyl L-methionine ester, N,N'-diacyl L-cystine ester and N-acyl L-cysteine ester, wherein the acyl group is derived from fatty acids having from 1 to 9 carbon atoms, and the ester group is derived from fatty alcohols having from 1 to 22 carbon atoms.

12 Claims, No Drawings

FORTIFICATION OF FOODSTUFFS WITH N-ACYL DERIVATIVES OF SULFUR-CONTAINING L-AMINO ACID ESTERS

BACKGROUND OF THE INVENTION

This invention relates to the fortification of proteinaceous foodstuffs, which are deficient in sulfur-containing amino acids with nutritionally available derivatives of those amino acids. The term 'proteinaceous foodstuff' is meant to encompass protein per se, whether derived from vegetable or animal sources, and additionally, to manufactured products intended for human or animal consumption containing such proteins as a significant component.

There is considerable impetus to satisfy the protein requirement in the diet of man with protein derived exclusively from vegetable sources. There are essentially two reasons which compel human populations to look to vegetable proteins for a substantial, if not an exclusive, source of dietary protein. The paramount reason is one of efficiency. That is, at least in certain parts of the world, it is no longer feasible, from the standpoint of consumption of energy, to grow a crop, to feed livestock, to obtain required dietary protein. The second reason is best couched in terms of nutrition and health. Manufactured foodstuffs based on vegetable proteins afford the possibility of ultimately achieving a perfect balance of nutrients with controlled exclusion of certain identified detrimental agents, such as cholesterol. And, there are subsidiary reasons involving the factor of convenience, and, to some, reasons of personal conviction.

There appears to be no question as to the capacity to obtain vegetable proteins in sufficient quantity. Success in the agriculture of, for example, the legumes (and in particular the soybean) have assured the ready procurement of vegetable protein in quantity. And this assurance of quantity is, in part, attributable to the development of associated technologies to exploit and make available this source of native vegetable protein. The principal concern is one of quality of that vegetable protein. If the vegetable protein is not nutritionally the equivalent of protein derived from animal sources, that is, of comparable quality, the fact that the vegetable protein is obtainable in quantity is of lessened significance. The fact is that proteins derived from a chosen plant species source are not of comparable nutritional quality to animal sources. This is evident, in part, by examination of the amino acid content, or profile, of a chosen plant protein. For example, wheat gluten is deficient in lysine; soybean protein is deficient in the sulfur-containing amino acids, such as methionine. Nutritionists have applied the term "limiting" to such amino acids, and have noticed that a protein characterized by a particular limiting essential amino acid is effectively levelled in nutritive value to the content of the first limiting amino acid. For example, if a certain vegetable protein was relied upon for the sole source of dietary protein, and if that protein was characterized by an amino acid profile revealing certain limiting amino acids, it would be necessary to consume in the diet an excessive amount of that protein in order to insure the nutritionally required intake of those limiting essential amino acids. Besides the sheer economic waste of such a diet, there is increasing evidence in the scientific literatue that excess dietary protein may have detrimental physiological effects.

Fortification of proteinaceous foodstuffs with sulfur-containing amino acids, and particularly with respect to methionine, has typically involved direct addition of DL-methionine as the free acid. The DL racemic mixture was employed even though only the L stereoisomeric form is found incorporated in human protein because it was thought that methionine ws one of the few α-amino acids in which the D form experienced the metabolic conversion to the L form. However, all attempts to fortify methionine deficient foodstuffs with free DL-methionine proved unfeasible because of a severely intractable flavor problem. It was discovered that foodstuffs so fortified with DL-methionine developed off-flavors and became discolored. This effect was particularly noticeable for foodstuffs that were either heated prior to eating, or were stored for an indefinite period in a hydrated condition, but the effect was also noticed after dry storage. The chemical basis for the generation of these off-flavors and unsightly discolorations was, in part, attributable to the well-known Strecker degradation — or more commonly, the Maillard reaction (chemical browning). The Maillard reaction comprises a set of reactions between amino containing compounds (here free α-amino acids) and carbonyl-containing compounds (for example, reducing sugars present in great abundance in the fortified foodstuff). The Maillard reaction is particularly distressing when sulfur-containing amino acids are involved because of the generation and liberation of noxious mercaptans and sulfides; e.g., methional is freely formed in foodstuffs fortified with methionine. Also, distinct from the Maillard reaction, degradative reactions, such as air oxidation of these sulfur-containing amino acids, adversely affect flavor. Needless to say, alternate means were sought to alleviate the sulfur amino acid deficiencies in vegetable derived proteins.

One means, of limited practical utility, involved blending proteins from different vegetable sources such that a particular amino acid deficiency of one protein was substantially cured by blending with it a precise amount of a distinct protein having that particular amino acid present in relative excess. By careful selection and precise blending, it is possible to achieve a reciprocal complementing effect. For example, sesame seed protein is rich in methionine but poor in lysine; soybean protein is poor in methionine but rich in lysine; consequently a precise blending of the two yields a more nutritionally balanced vegetable protein.

Other means available from the prior art are designed to defeat the Maillard reaction in the face of free addition of selected amino acids. Representative diverse means suggested by the prior art are: (1) encapsulation of the free amino acid; (2) simultaneous incorporation of certain alleged anti-browing agents, e.g., pyrocarbonic acid esters, and O-carboxy anhydrides of α-anhydroxy acids (U.S. Pat. No. 3,337,348 granted Aug. 22, 1967); and (3) utilization of the plastein reaction. This last mentioned means involves the bonding of the added amino acid by peptide linkage to protein molecules which constitute the bulk of the proteinaceous component of the foodstuff. All of the above-listed means are of limited practical utility. Consequently, the prior art continued the search for means in circumvention of the Maillard reaction. Among these means were suggested the utilization of tasteless derivatives of certain amino acids which were relatively inert to degradation yet nutritionally available on ingestion.

For example, success has been achieved on derivatization of certain sulfur-containing amino acids, especially methionine. For example, U.S. patent application Ser. No. 256,860, filed May 25, 1972, now U.S. Pat. No. 3,878,305, discloses that certain N-acyl L-methionine compounds, exhibit increased stability, attenuated taste characteristics and are nutritionally available.

SUMMARY OF THE INVNETION

It has now been discovered that another class of sulfur-containing amino acid compounds exhibiting excellent stability and attenuated taste are nutritionally available. More particularly, it has been discovered that sulfur-containing amino acid derivatives selected from the group consisting of N-acyl L-methionine ester, N,N'-diacyl-L-cystine ester and N-acyl L-cysteine ester, wherein the acyl group is derived from fatty acids having from 1 to 9 carbon atoms, and the ester group is derived from fatty alcohols having from 1 to 22 carbon atoms are nutrionally available. In other words, these derivatives are safely and effectively metabolized providing the sulfur-containing amino acid of the derivative. It has further been discovered that these derivatives exhibit a low taste threshold level and that at taste threshold levels the taste presented is not offensive relative to free methionine.

Accordingly, in its composition aspect, the present invention is a proteinaceous foodstuff comprising a sulfur-containing amino acid deficient protein and a nutritionally supplemental amount of an L-amino acid derivative selected from the group consisting of N-acyl L-methionine esters, N,N'-diacyl L-cystine esters, and N-acyl L-cysteine esters. Preferably these foodstuffs are essentially free of the corresponding D-isomer of amino acid derivatives since these isomers are not nutritionally available.

The present invention further provides a means of fortifying foodstuffs with sulfur-containing amino acids comprising adding to said foodstuffs a nutritionally effective amount of an amino acid derivative selected from the group consisting of N-acyl L-methionine ester, N,N'-diacyl L-cystine ester, and N-acyl L-cysteine ester.

DETAILED DESCRIPTION OF THE INVENTION

A detailed description of the invention is conveniently presented by discussion of three interrelated topics: (A) Identification and preparation of the preferred sulfur-containing amino acid derivatives; (B) Class of proteinaceous foodstuffs affected by this invention; and (C) Meaning of nutritionally effective amino acid fortification.

A. Identification and Preparation of the Derivatives

As an experimental procedure for evaluating the palatability of foodstuffs fortified in accordance with this invention, a test method was developed to simulate the reaction conditions likely to be encountered by a foodstuff susceptible to degradation in the Maillard reaction. Basically the test method involves the reaction between a reactive carbonyl compound, such as diacetyl, $CH_3(CO)_2CH_3$, and the amino acie (or derivative) of interest. The model reactive carbonyl compound, diacetyl, is analogous to the reducing sugars of real food systems in reaction with amino acids.

The test method clearly reveals stability of derivatives of methionine, cystine and cysteine relative to the free acids in the food environment: To 100 ml. volumes of a 80:20 diglyme/water solution containing 0.86 grams diacetyl was added either 1.49 grams of methionine or 2.40 grams of cystine. Upon heating these solutions to a temperature of about 80°C for about 30 minutes, it was observed that the solutions turned dark brown and evolved strongly offensive odors characteristic of sulfides and mercaptans. Similar results are obtained when cysteine is subjected to this test. But when the N-acyl ester derivatives (N-acetyl methionine ester and N,N'-diacetyl cystine ester) are substituted for the corresponding free acid at comparable molar concentrations in the foregoing test procedure, the solutions are observed to remain colorless and no odors were detected. Similar results are obtained when N-acetyl cysteine ester is subjected to this test. In this manner candidate amino acid derivatives were screened for stability against the Maillard reaction. It was thereby determined that N-acyl ester derivatives of cystine, cysteine, and methionine were potentially suitable derivatives for practice of the invention herein set forth. (Acceptable taste and nutritional availability are the other criteria which must be met.)

An unexpected discovery was that these N-acyl L-sulfur amino acid ester derivatives are nutritionally available. Proof that these N-acylated L-sulfur-containing L-amino acid esters are nutritionally available to the animal organism was obtained by conventional feeding studies on white rats. Table I clearly demonstrates this discovery.

TABLE I

Utilization of L-methionine, N-acetyl-L-methionine and N-acetyl-L-methionine esters in Growing Rats

| 10% Protein Diet Consisting of: | Two Week Wt. Gain (grams) | Total Protein Consumed (grams) | Ratio Wt. Gain to Protein Consumed |
|---|---|---|---|
| Isolated Soybean Protein (Promine F, a soy protein isolate available from Central Soy Co.) | 32.3 | 18.2 | 1.80 |
| + 0.15% L-methionine | 62.8 | 19.5 | 3.25 |
| + 0.19% N-acetyl L-methionine | 66.5 | 20.3 | 3.26 |
| + 0.21% N-acetyl-L-methionine methyl ester | 60.2 | 19.2 | 3.12 |
| + 0.25% N-acetyl-L-methionine ethyl ester | 65.2 | 21.2 | 3.07 |

Table I shows that soy isolate, known to be deficient in sulfur amino acids, provides poor growth relative to the amount of protein consumed. When the soy isolate is fortified with L-methionine, growth improves significantly. The Table shows the nutritional availability of L-methionine. The Table also shows that N-acetyl-L-methionine is nutritionally the equivalent of the free L-methionine acid. In addition the Table illustrates the present invention. It shows that N-acetyl-L-methionine methyl and ethyl esters are nutritionally equivalent to methionine. (Except for methionine a complete diet was provided to the rats. The diet comprised 10% soybean protein, 39% sucrose, 39% starch, 6% corn oil, 5% mineral and vitamin mix. The data shows equivalence within experimental error.)

While the above-detailed feeding studies involve N-acetyl-L-methionine methyl and ethyl esters, similar results are obtained from feeding studies involving analogous $N—C_{1-9}$ acyl derivatives of methionine $C_{1-22}$ esters, as well as the $N—C_{1-9}$ acyl derivatives of cystine and cysteine $C_{1-22}$ esters. In other words, the invention fully comprehends derivatives where the N-acyl substituent is derived from the well-known and commercially available fatty acids having from 1 to 9 carbon atoms and the ester substituent is derived from well-known and commercially available fatty alcohols having from 1 to 22 carbon atoms, such as, for example, methanol, ethanol, propanol, butanol, hexanol, octanol, decanol, dodecanol, and hexadecanol.

Preferred sulfur-containing amino acid derivatives of the invention are $N—C_{1-4}$ acyl amino acid $C_{1-10}$ esters, and more preferred are $N—C_{1-4}$ acyl amino acid $C_{1-4}$ esters. Amino acid derivatives of methionine are most preferred.

L-amino acids contaminated with less than about 5.0% of its D-isomer are readily obtainable commercially, and are suitable for preparation of the N-acylated L-amino acid esters of this invention. The derivatives of this invention are conveniently prepared by reacting the anhydride of the fatty acid taken with the sulfur-containing L-amino acid of interest to obtain the N-acylated amino acid. A complete description of this acylation reaction is given by Birnbaum, et al., 194 J. Biol Chem. 455 (1952), where the conditions of reaction are such that racemization to the corresponding D-isomer does not occur to a significant extent. The ester derivative of the N-acylated acid is then formed in any conventional manner, for example, by reacting the acylated compound under acid conditions with a fatty alcohol.

B. Class of Foodstuffs

The class of foodstuffs contemplated in this invention is comprised of any food source which for reasons of nutrition requires fortification with selected sulfur-containing amino acids. But the invention is primarily concerned with proteinaceous foodstuffs which are either treated to a heating step prior to consumption; held for an indefinite period in a hydrated state prior to consumption; or held for a prolonged period in dry storage. However, the invention finds its principal application in foodstuffs which contain protein derived substantially from vegetable sources, e.g., the oil seeds and leguminous seeds, principally the soybean. Specific examples of such proteinaceous foodstuff products, where the protein component is substantially derived from vegetable sources, include: textured vegetable protein meat analogues, vegetable protein cheese analogues, beverages, nut butters, breakfast cereal products, proteinaeous snack products, pet foods — both kibbled and hydrated, and animal feeds.

In greater detail, an especially important embodiment of the invention is the fortification of certain proteinaceous source materials, such as the soybean. Ordinarily, soybean protein is available in certain fractions which are distinguished by the method of preparation. These fractions are popularly known as soybean meal, flour, concentrate and isolate. Each fraction is characterized by its protein content, which ranges from about 30% for the meal to about 90% for the isolate. Successive fractionations, or purifications, not only increase the protein content but also remove off-flavor ingredients and improve the textural properties of the protein. However, the benefication achieved by fractionation is not without detriment, for as the protein concentration is increased the nutritive quality of the protein decreases. The magnitude may be seen in relative terms. For example, if the nutritive quality of the meal is accorded a value of 1.0, then the nutritive quality ratio of meal:flour:concentrate:isolate can be 1.0:0.81:0.74:0.61. This decrease in protein quality is due primarily to a reduction in the sulfur-containing and other essential amino acids as fractionation progresses. Soybean proteins are first limiting in the sulfur-containing amino acids, but they are also deficient in lysine, threonine, and valine. Consequently, in any scheme of fortification it is necessary to be conscious of the entire amino acid profile of a given proteinaceous material. Such information is readily available from published tables of amino acid content of diverse proteins, for example, *Amino Acid Content of Foods and Biological Data on Proteins;* Food and and Agricultural Organization of the United Nations, No. 24, 1970. In this manner, it is possible to nutritionally balance all amino acids to any desired or optimum level. Therefore, it is understood that this invention encompasses all proteinaceous foodstuffs which are deficient in sulfur-containing amino acids, even when that deficiency is not first limiting.

Other proteinaceous foodstuffs contemplated by this invention include, among the oil seeds: cottonseed, peanut, safflower, sesame, sunflower, rapeseed and flax meal (linseed meal); among the milk protein: casein, non-fat milk solids, lactalbumin, and whey protein; among the cereal grains: wheat (gluten), wheat, corn, barley, oats, rice, rye, wheat bran, and wheat germ; among the marine proteins: fish protein concentrate, and fish muscles soluble; among the plant proteins: leaf (e.g., alfalfa) and coconut; among the single-cell proteins: yeast, and petroleum, methane and carbohydrate feeding microbes; among the animal proteins: collagen (gelatin), keratin, muscle, serum protein, offal, wool, silk waste, meat protein concentrate, and feather meal. Also contemplated by this invention are manufactured proteinaceous foodstuffs formulated in part from selected proteins from the above representative enumeration. In this respect it is understood that the proteinaceous source material may be fortified directly, and thereby provide a nutritionally balanced proteinaceous foodstuff useful either alone or in combination with other ingredients as a manufactured foodstuff; or fortification may be effected during formulation of the manufactured proteinaceous foodstuff.

C. Nutritionally Effective Fortification, Meaning

No absolute meaning can be attached to the term 'nutritionally effective fortification' in the abstract. As mentioned above, nutritionally effective, or optimum, fortification is critically dependent on the precise amino acid constitution of the particular protein, and it is well within the routine of one skilled in the art to develop a scheme of fortification given the identity of the protein and its particular amino acid deficiencies. With respect to proteins deficient in the sulfur-containing amino acids, the practice of this invention will typically require from as little as 0.1 up to 10.0 weight percent addition of methionine equivalents based on the total protein content of the foodstuff.

A conventional means of specifying the ranges of fortification contemplated in this invention is to make these ranges relative to the total sulfur-amino acid content of whole egg protein, which is considered optimum and ranges from approximately 5.4 to 7.2 weight percent of the total protein in the egg. In fact, the individual amino acids in whole egg protein are in such quantity and proportion that they comprise an ideal pattern for high quality protein. The content of a specific amino acid in this protein is exceptionally uniform when expressed as percent of the protein. It is therefore reasonable to conclude that the unit for safe addition of an amino acid to a food should be the difference between the amount of that amino acid present in whole egg protein (expressed as the percent of the total protein) and the amount present in the protein to which the amino acid is being added.

However, in specifying levels of addition in an amino acid fortification scheme involving addition of acetyl derivatives of L-methionine, L-cystine and L-cysteine, it is important to take notice of certain metabolic relations, namely: (1) Methionine can fully replace the nutritional requirement for cystine and cysteine according to the following overall stoichiometry: one mole methionine → one mole cysteine, and two moles methionine → one mole cystine. (2) Cystine and cysteine are metabolically interconvertible according to the following stoichimetry: one mole cystine ⇌ two moles cysteine. (3) Although documented for certain microbial beings, the reverse relationship, cysteine or cystine going to form methionine, is not thought to e a significant metabolic pathway in the higher animal organisms. Methionine is, therefore, termed an "essential" amino acid.

Also, it should be noted that of the sulfur-contaning amino acids in whole egg protein about 60% is represented as methionine and 40% is represented as cystine and cysteine collectively. Accordingly, the above-given range of 5.4–7.2 wt. percent, for the sulfur-containing amino acid component of whole egg protein should be adjusted to 3.2–7.2 by multiplying the lower limit by 0.60 in order to give a more realistic range relative to methionine content. And, relative to total cystine and cysteine, the range units should be reduced 40%; thus, 2.2–2.9% is a more useful range when the object is fortification with cystine and cysteine.

Therefore, in accordance with this invention, when it is desired to fortify a foodstuff with L-methionine, the adjusted range, 3.2–7.2, is useful in determining the level of fortification required to benefit the chosen foodstuff to the quality of whole egg protein in sulfur-containing amino acids. For example, if a given proteinaceous foodstuff of interest was found to contain 2.0 weight percent sulfur amino acids (arbitrarily taken as methionine equivalents) of the total protein, the preferred method of this invention calls for the addition of molecular wt. of L-methionine derivative/molecular wt. of L-methionine × [3.2–2.0 to 7.2–2.0]% × 100 grams protein = grams of N-acyl L-methionine ester derivative per 100 grams protein required in order to bring the total sulfur amino acid content of the preteinaceous foodstuff up to the level of egg. That is, the difference between the actual weight percentage of sulfur amino acids (assumed equivalent to methionine) and the optimum weight percentage found in egg (also assumed equivalent to methionine) is multiplied by the molecular weight ratio of the particular N-acyl L-methionine ester derivative used in fortification to methionine. If an N-acyl derivative of L-cystine or L-cysteine is used in fortification, the optimum range of addition is found by multiplying the range [2.2–X to 2.9–X] (where X, based on the total protein of the particular foodstuff, is the sulfur-containing amino acid percentage component equivalent to either cystine or cysteine, respectively) by the molecular weight ratio of the particular derivative of either L-cystine or L-cysteine, respectively, to cystine or cysteine, respectively. This method of calculating the range to be added is of course approximate, but given the extreme variability of foodstuffs, this method of calculation provides standard rule and nomenclature upon which comparison of diverse foodstuffs may be made.

The actual method of incorporaion of the amino acid derivatives encompassed by this invention to obtain the fortified proteinaceous foodstuff, is of course controlled by the nature of the particular foodstuff. For materials such as soybean flour, the derivatives may be added as dry powders; for nonhomogeneous materials such as animal feed formulations, the derivatives may be incorporated by spraying from solution; for manufactured proteinaceous foodstuffs such as nut butters, the derivatives may be incorporated as any minor ingredient, or enter the formulation dispersed in a suitable vehicle, such as oil. These matters are well within the routine consideration of one skilled in the art.

The following examples of proteinaceous foodstuffs fortified with N-acyl derivatives of L-methionine ester, L-cystine ester and L-cysteine ester are given to indicate the range of products contemplated in the instant invention. It is of course to be understood that these examples are by way of illustration only, and in no way are to be considered as limiting the scope of the invention.

EXAMPLE I

Part A — Preparation of Ester

N-acetyl-L-methionine ethyl ester was prepared in the following manner:

One hundred grams of L-methionine were mixed with 700 ml. of ethanol containing 30 g NaOH to form a stirrable slurry. To this mixture there was slowly added with stirring 1.5 mole equivalents (based on L-methionine) of acetic anhydride. This mixture was continuously stirred until the slurry turned to a clear solution. The resulting clear solution contained N-acetyl-L-methionine dissolved in ethanol.

To this solution was added with stirring sufficient anhydrous $H_2SO_4$ to neutralize the NaOH and render the solution slightly acidic. Under these conditions the N-acetyl-L-methionine was converted to N-acetyl-L-methionine ethyl ester. The remaining ethanol and ethyl acetate (formed from the reaction of residual acetic acid and acetic anhydride with NaOH) was removed by warming the mixture under vacuum. The remaining mixture was slurried with choloroform and filtered to removed sodium sulfate salts. The ester-chloroform solution was then water washed to remove any remaining salts. The resulting ester-chloroform solution was then warmed under vacuum to remove the chloroform. The resulting material was N-acetyl-L-methionine ethyl ester.

While the above-described preparation is convenient, other methods are known and could be employed.

Part B — Fortified Foodstuff Products.

Fortification of certain diverse protein source materials with N-acetyl L-methionine ethyl ester, N,N'-diacetyl L-cystine ethyl ester and N-acetyl L-cysteine ethyl ester derivatives is accomplished by the addition of the derivative to the following protein containing materials.

| | % Addition of Total Protein | | | | | |
|---|---|---|---|---|---|---|
| | N-acetyl L-Methionine Ethyl Ester | | N,N'-diacetyl L-cystine Ethyl Ester | | N-acetyl L-cysteine Ethyl Ester | |
| Protein Sources | a | b | c | d | e | f |
| Animal Protein | | | | | | |
| Collagen (Gelatin) | 4.3 | 10.3 | 3.28 | 4.4 | 3.3 | 4.4 |
| Plant Protein | | | | | | |
| Leaf (Alfalfa) | 0.9 | 6.8 | 0.9 | 2.1 | 0.9 | 2.1 |
| Oilseeds | | | | | | |
| Soybean | | | | | | |
| Meal | 1.4 | 7.2 | 1.6 | 2.7 | 1.6 | 2.7 |
| Concentrate | 1.5 | 7.3 | 1.7 | 2.8 | 1.7 | 2.8 |
| Isolate | 2.0 | 7.7 | 1.9 | 3.0 | 1.9 | 3.0 |
| Cottonseed | 0.4 | 6.2 | 0.9 | 2.1 | 0.9 | 2.1 |
| Peanut | 1.7 | 7.3 | 1.3 | 2.3 | 1.3 | 2.3 |
| Sunflower | 3.9 | 5.3 | 0.9 | 2.1 | 0.9 | 2.1 |
| Flax Meal | 0.1 | 5.9 | 1.0 | 2.2 | 1.0 | 2.2 |
| (Linseed Meal) | | | | | | |
| Cereal Grains | | | | | | |
| Wheat (Gluten) | 2.6 | 5.3 | 0.3 | 1.4 | 0.3 | 1.4 |
| Wheat | 2.6 | 4.1 | — | — | — | — |
| Corn | 3.9 | 5.6 | 0.9 | 2.1 | 0.9 | 2.1 |
| Barley | 2.6 | 4.8 | 0.5 | 0.8 | 0.5 | 0.8 |
| Oats | 0.8 | 6.6 | 1.6 | 2.7 | 1.6 | 2.7 |
| Rice | 0.5 | 6.3 | 1.7 | 2.8 | 1.7 | 2.8 |
| Milk Protein | | | | | | |
| Casein | 2.3 | 5.2 | 2.8 | 4.0 | 2.8 | 4.0 |
| Non-fat milk solids | 3.4 | 5.7 | 2.1 | 3.2 | 2.1 | 3.2 |
| Whey protein | 2.3 | 4.6 | — | — | — | — |
| Lactalbumin | 2.3 | 5.3 | 0.1 | 0.3 | 0.1 | 0.3 |
| Marine Protein | | | | | | |
| Fish Protein Conc. | 1.1 | 4.3 | 0.1 | 1.3 | 0.1 | 1.3 |

Each of the foregoing proeinaceous foodstuffs is substantially improved in nutritive value by reason of the addition of the specified amino acid derivatives, provided the addition corrects a first-limiting deficiency. This will always be the case — either inherently, as with soybean protein, or by result of a complete fortification scheme which previously corrected first limiting conditions of amino acids other than the sulfur-containing. Moreover, this improvement is achieved without substantially adversely affecting flavor and odor, and without the production of potentially toxic and/or noxious degradation products.

The percent addition figures in the above example are calculated so as to benefit the indicated protein in sulfur amino acids to a level comparable to that of whole egg protein. In the example, equivalent benefication is achieved when the N-acetyl L-methionine ethyl ester, N,N'-diacetyl L-cystine ethyl ester, and N-acetyl L-cysteine ethyl ester, respectively, is replaced by a nutritionally equivalent amount of the corresponding derivativs having as acyl substituent: formyl, propionoyl, butyroyl, valeroyl, caproyl, enanthoyl, caprylyl, pelargonoyl, respectively; or having as the ester substituent: methyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl, henecosyl and docosyl, respectively.

The following examples are illustrative of products based on proteinaceous foodstuffs supplemented in accordance with the invention.

EXAMPLE II

A meat analog product is made according to the following formulation and procedure.

| Component | Parts by Weight |
|---|---|
| Soybean Concentrate (70% Protein) | 60.0 |
| Water | 40.0 |
| N-acetyl L-methionine ethyl ester | 2.0 |
| Fat | 10.0 |
| Starch | 10.0 |
| Beef Extract Flavoring | 5.0 |
| Food Coloring and Salt | — |

The components are blended to form a dough, which was passed through a three-fourth inch Brabender extruder using a temperature in the extruder of 150°C. A pressure of approximately 450 psi is developed within the extruder and forces a cylindrical product from the 4 mm. exit die. The extruded product is dried and ground to particle sizes having an average diameter of one-fourth inch. When the product is hydrated and shaped into hamburger-like patties and fried in an oiled pan, no off-flavors attributable to the degradation of products of methionine are observed.

Where in Example II, the N-acetyl L-methionine ethyl ester is replaced by a nutritionally equivalent amount of either: N-formyl L-methionine methyl ester, N-acetyl L-methionine methyl ester, N-propionoyl L-methionine ethyl ester, N-propionoyl L-methionine ethyl ester, N-valeroyl L-methionine propyl ester, N-enanthoyl L-methionine dodecyl ester, N,N'-diacety L-cystine ethyl ester, N,N'-diacetyl L-cystine methyl ester, N-acetyl L-cysteine ethyl ester, N-enanthoyl L-cysteine ethyl ester, N-propionoyl L-cysteine propyl ester, respectively, no off-flavors attributable to degradation of products of the derivatives are perceived.

EXAMPLE III

A fortified peanut butter composition is made by adding 0.6 parts by weight N-acetyl L-methionine methyl ester to a commercial peanut butter of the following composition:

| Component | Parts by Weight |
|---|---|
| Peanut paste | 90.0 |
| Salt | 1.2 |
| Sucrose | 5.8 |
| Molasses | 0.5 |
| Soybean monoglycerides | 0.7 |
| Rapeseed oil (iodine value 2) | 0.56 |
| Soybean oil (iodine value 2) | 0.84 |
| Soybean oil (iodine value 107) | 0.40 |

A sample of this fortified peanut butter is heated in a water bath at 95°C for 2½ hours. No off-flavors or odors are detected. However, when an otherwise identical peanut butter is formulated with 0.4 parts by weight L-methionine, strong odors and off-flavors were apparent after 2 hours of heating in a water bath at 95°C.

When in Example III the peanut paste is replaced by an equivalent amount of a bland soybean paste (hulled, deflavored comminuted whole beans), equivalent results are obtained with respect to flavor on fortification with N-acetyl L-methionine methyl ester.

EXAMPLE IV

A canned pet food product embodied by the present invention is prepared by mixing and sealing the following in cans:

| Component | Parts by Weight |
|---|---|
| Water | 56 |
| Wheat flour | 5 |
| Soybean concentrate | 25 |
| N-Acetyl L-methionine propyl ester | 1 |
| Collagen | 1 |
| Iodized salt | 0.3 |
| Beef extract flavor | 2 |
| Corn meal | 10 |
| Fat | 10 |

The canned product is autoclaved at 150°C for 30 minutes, and on opening no evidence of methionine degradation is perceived.

EXAMPLE V

A complete cattle feed composition embodied by the present invention is prepared by grinding and mixing the following:

| Component | Parts by Weight |
|---|---|
| Timothy hay | 960 |
| Dehydrated alfalfa | 40 |
| Yellow corn | 600 |
| Corn starch | 300 |
| Iodized salt | 10 |
| Bone meal | 20 |
| Soybean meal | 30 |
| N-acetyl-L-Methionine ethyl ester | 1.0 |
| Biuret | 28 |

This composition is fed to 400 pound steers at the rate of approximately 12 pounds per day. Animals placed on this diet experience optimum growth rates and the feed is characterized by the absence of potentially toxic degradation products of the methionine supplement.

What is claimed is:

1. A proteinaceous foodstuff comprising an edible sulfur-containing amino acid deficient protein and a nutritionally supplemental amount of a sulfur-containing amino acid derivative selected from the group consisting of N-acyl L-methionine ester, N,N'-diacyl L-cystine ester and N-acyl L-cysteine ester, wherein the acyl group is derived from fatty acids having from 1 to 9 carbon atoms, and the ester group is derived from fatty alcohols having from 1 to 22 carbon atoms.

2. The foodstuff of claim 1 where said foodstuff is derived from a member selected from the group consisting of: animal by-products, microbial cells, oil seeds, cereal grains and plant vegetation.

3. The foodstuff of claim 1 wherein the foodstuff is selected from the group consisting of: texturized vegetable protein meat analogs, vegetable protein derived cheese analogs, beverages, nut butters, breakfast-like cereal formulations, and convenient proteinaceous snack foods.

4. The foodstuff of claim 1 where the sulfur-containing amino acid derivative is N-acyl-L-methionine ester.

5. The foodstuff of claim 4 where the acyl group is derived from fatty acids having from 1 to 4 carbon atoms and the ester group is derived from fatty alcohols having from 1 to 10 carbon atoms.

6. The foodstuff of claim 5 where the ester group is derived from fatty alcohols having from 1 to 4 carbon atoms.

7. The foodstuff of claim 6 wherein the derivative is selected from the group consisting of N-formyl L-methionine methyl ester, N-formyl L-methionine ethyl ester, N-acetyl L-methionine methyl ester and N-acetyl L-methionine ethyl ester.

8. A method of fortifying proteinaceous foodstuffs with sulfur-containing amino acids comprising adding to said foodstuffs a nutritionally effective amount of an amino acid derivative selected from the group consisting of N-acyl L-methionine ester, N,N'-diacyl L-cystine ester and N-acyl L-cysteine ester, wherein the acyl group is derived from fatty acids having from 1 to 9 carbon atoms, and the ester group is derived from fatty alcohols having from 1 to 22 carbon atoms.

9. The method of claim 8 wherein the acyl group is derived from fatty acids having from 1 to 4 carbon atoms.

10. The method of claim 8 where the ester group is derived from fatty alcohols having from 1 to 10 carbon atoms.

11. The method of claim 10 where the ester group is derived from fatty alcohols having from 1 to 4 carbon atoms.

12. The method of claim 11 wherein the derivative is selected from the group consisting of N-acetyl L-methionine methyl ester and N-acetyl methionine ethyl ester.

* * * * *